Aug. 14, 1928.
G. W. YANSS
1,680,927
AUTOMOBILE BUMPER BRACKET
Filed Nov. 30, 1926
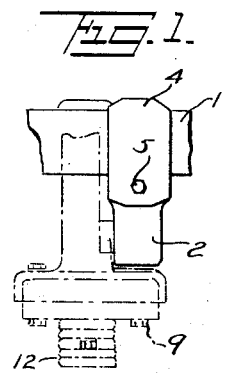
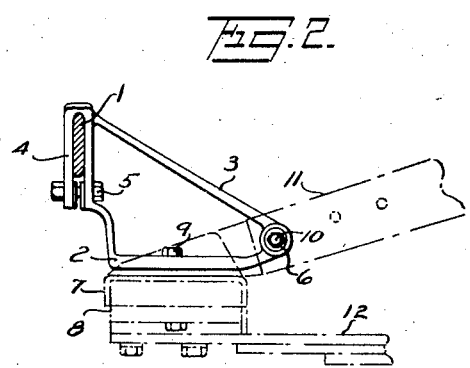
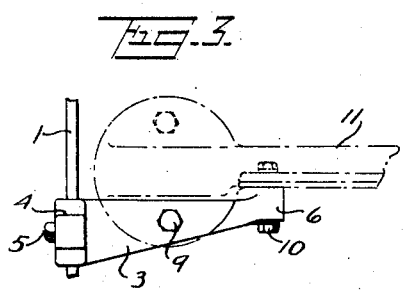
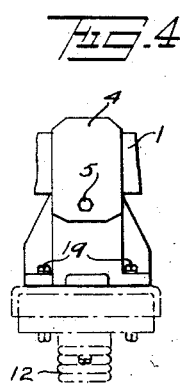
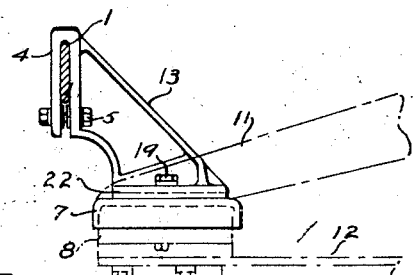
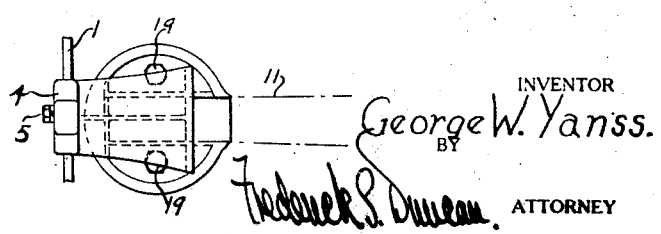
INVENTOR
George W. Yanss.
BY
Frederick P. Duncan.
ATTORNEY Patented Aug. 14, 1928.

1,680,927

UNITED STATES PATENT OFFICE.

GEORGE W. YANSS, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed November 30, 1926. Serial No. 151,616.

This invention relates to bumper brackets for automobiles of a type in which the frame carrying the body of the car has a horn with a socket member, provided with a flexible fabric cushion supported by the vehicle spring.

It is an object of this invention to provide a bumper bracket adapted to be attached readily to such a socket without drilling or special machining operations, and which is designed to co-operate also with the horn.

The bracket consists of a base for attachment to the socket and a rearwardly extending portion which may either be attached to, or abut the horn. Mounted on the bracket is a clamp for holding a bumper bar.

A clear conception of the construction and further objects of this invention may be had from the following specification in conjunction with the accompanying drawings in which:

Fig. 1 discloses in front elevation the now preferred form of bracket embodying the invention, shown in place on the socket.

Fig. 2 is a side view of Fig. 1.

Fig. 3 is a plan view of Figs. 1 and 2.

Fig. 4 is a front view of a modified form of the invention.

Fig. 5 is a side view of Fig. 4, and

Fig. 6 is a plan view of Figs. 4 and 5.

The now preferred form of the invention consists of a base 2, shaped as shown in Figs. 1 and 2, having a clamp 4, formed in the end of its upright portion, to hold the bumper bar 1. A bracing member 3, is formed in the back of clamp 4 and is joined to the base 2 at boss 6. As already noted briefly in the type of spring connection with which the improved bumper bracket is to be used, the horn is provided with a socket 7 containing the fabric cushion 8, which is bolted to the vehicle springs 12. The bracket base 2 is fastened to the socket 7 by suitable means such as a bolt 9 passing through the base 2, socket 7 and cushion 8. The bolt 9 preferably is an original member of the cushion device thereby obviating the necessity of drilling a new hole and providing a new bolt for mounting the bracket.

The boss 6 preferably is fastened to the horn 11 by means of a bolt 10, thereby securely fastening the bracing member so that the bracket is reinforced against sudden strain should the bumper be struck. Bolt 10 is passed through the hole formerly used by a bolt or rivet for holding the horn to the frame, and thus it is only necessary to remove the already existing bolt and substitute a longer bolt 10, in order to complete the mounting of the bumper bracket in such an installation. The clamp 4 is provided with a bolt 5 for holding the jaws of the clamp about the bumper bar 1.

A modified form of this invention as shown in Figs. 4 and 5, and 6, consists in forming the base 22 of the bracket 13 in the shape of a yoke or fork in order that it may straddle the horn 11. This bracket is fastened to the socket 7 and cushion 8 by means of bolts 19 and its forked portion 22 rests on the horn 11. As in the form already described, existing bolt holes in socket 7 may be used to receive the bolts 19. This modification forms the subject matter of specific claims in my co-pending application Serial No. 246,444 filed January 13, 1928, which has been divided from the present application.

Each form of bracket herein illustrated constitutes a secure fastening for a bumper when used on an automobile having this particular type of fabric cushion. It is apparent, however, that other means of mounting might be used, such as by the provision of a plate secured between the horn and the vehicle springs upon which a similar bumper bracket might be mounted, in connection with the forms of automobiles not having a fabric cushion.

I claim:

1. A bumper bracket for automobiles of the type in which the frame is provided with a horn having a socket formed thereon containing a fabric cushion connected with a vehicle spring, said bracket comprising a base having an upright portion with clamping means thereon for a bumper member, said upright having a reinforcing member connecting said base and said upright, and means for connecting said bracket to said socket.

2. A bumper bracket for automobiles of the type in which the frame is provided with a horn having a socket formed thereon containing a fabric cushion connected with a vehicle spring, said bracket comprising a base having an upright portion with clamping means thereon for a bumper member.

and a reinforcing member connected to said upright and adapted to be connected to said horn.

3. A bumper bracket for automobiles of the type in which the frame is provided with a horn having a socket formed thereon containing a fabric cushion connected with a vehicle spring, said bracket comprising a base having an upright portion with clamping means thereon for a bumper member, and a reinforcing member connected to said upright and adapted to be connected to said horn, and said base also adapted to be fastened to said socket.

4. A bumper bracket for automobiles of the type in which the frame is provided with a horn having a socket formed thereon containing a fabric cushion connected with a vehicle spring, said bracket comprising a base having an upright portion with clamping means thereon for a bumper member, and a reinforcing member connected to said upright and adapted to be connected to said horn, and said base being adapted to be fastened to said socket, by means of bolts situated in existing bolt holes of said horn and socket respectively.

5. A bumper bracket for automobiles of the type in which the frame is provided with a horn having a socket formed thereon containing a fabric cushion connected with a vehicle spring, said bracket comprising a base having an upright portion with clamping means thereon for a bumper member, and a reinforcing member connected to said upright, the point of connection forming a boss, and a bolt adapted to extend through said boss into said horn.

In testimony whereof, I have signed this specification.

GEORGE W. YANSS.